(12) United States Patent
Miller

(10) Patent No.: US 9,355,495 B2
(45) Date of Patent: May 31, 2016

(54) METHOD AND SYSTEM FOR 3D MODELING USING FEATURE DETECTION

(71) Applicant: TRIMBLE NAVIGATION LIMITED, Sunnyvale, CA (US)

(72) Inventor: Robert Miller, Commerce City, CO (US)

(73) Assignee: Trimble Navigation Limited, Sunnyvale, CA (US)

( * ) Notice: Subject to any disclaimer, the term of this patent is extended or adjusted under 35 U.S.C. 154(b) by 168 days.

(21) Appl. No.: 14/050,206

(22) Filed: Oct. 9, 2013

(65) Prior Publication Data

US 2015/0097828 A1    Apr. 9, 2015

(51) Int. Cl.
| | |
|---|---|
| *G06T 17/20* | (2006.01) |
| *G06T 19/00* | (2011.01) |
| *G01C 15/00* | (2006.01) |
| *G06T 17/10* | (2006.01) |
| *G01C 1/04* | (2006.01) |
| *G06F 17/50* | (2006.01) |

(52) U.S. Cl.
CPC .............. *G06T 17/20* (2013.01); *G01C 15/002* (2013.01); *G06T 17/10* (2013.01); *G06T 19/00* (2013.01); *G01C 1/04* (2013.01); *G06F 17/5004* (2013.01); *G06F 2217/34* (2013.01); *G06T 2200/24* (2013.01); *G06T 2219/012* (2013.01)

(58) Field of Classification Search
None
See application file for complete search history.

(56) References Cited

U.S. PATENT DOCUMENTS

| | | | |
|---|---|---|---|
| 6,256,595 B1* | 7/2001 | Schwalb et al. ................... 703/1 | |
| 6,330,523 B1 | 12/2001 | Kacyra | |
| 7,324,104 B1* | 1/2008 | Bitter .................... G06T 7/0081 | 345/419 |
| 7,548,650 B2* | 6/2009 | Qamhiyah et al. ............ 382/181 |
| 7,860,299 B2 | 12/2010 | Chaperon | |
| 8,855,417 B2* | 10/2014 | Masuda ............... G01B 5/0035 | 382/103 |
| 2006/0192946 A1 | 8/2006 | Walser | |
| 2007/0118805 A1* | 5/2007 | Kraus et al. .................... 715/757 | |
| 2008/0040080 A1* | 2/2008 | Bae ......................... G06T 17/20 | 703/1 |
| 2008/0133173 A1* | 6/2008 | Chang ..................... G01B 11/03 | 702/155 |
| 2009/0009513 A1 | 1/2009 | Van Den Hengel et al. | |
| 2010/0165101 A1* | 7/2010 | Kludas et al. .................. 348/135 | |
| 2012/0116728 A1* | 5/2012 | Shear et al. ........................ 703/1 | |
| 2013/0034270 A1* | 2/2013 | Masuda ............... G01B 5/0035 | 382/106 |

FOREIGN PATENT DOCUMENTS

WO    2015/053954 A1    4/2015

OTHER PUBLICATIONS

International Search Report and Written Opinion from the International Searching Authority for PCT/US2014/057480, mailed Mar. 5, 2015, 17 pages.
Communication Relating to the Results of the Partial International Search from the International Searching Authority for PCT/US2014/057480, mailed Dec. 23, 2014, 6 pages.

* cited by examiner

*Primary Examiner* — Barry Drennan
*Assistant Examiner* — Jason Pringle-Parker
(74) *Attorney, Agent, or Firm* — Kilpatrick Townsend & Stockton LLP

(57) ABSTRACT

A method includes providing a processor, obtaining an image of a scene including one or more objects, and presenting, using the processor, the image of the scene to a user. The method also includes receiving a geometry type associated with one of the one or more objects, receiving a set of inputs from the user related to the one of the one or more objects, and determining, using the processor, a centerline of the one of the one or more objects. The method further includes measuring, using the processor and inputs from the user, two or more coordinate positions along the centerline, receiving a dimension associated with the one of the one or more objects, and creating, using the processor, a 3D solid model using the geometry type, the dimension, the set of inputs, and the two or more coordinate positions.

19 Claims, 10 Drawing Sheets

METHOD AND SYSTEM FOR 3D MODELING USING FEATURE DETECTION

BACKGROUND OF THE INVENTION

Optical instruments, such as surveying instruments are commonly used for distance measurement and comprise a complex arrangement of optical and electronic elements. In recent years, imaging devices have been integrated in surveying instruments providing digital video data of an object in addition to distance measurement information. The imaging and distance measurement information may include horizontal and vertical angles, a distance to the object and an image of the object revealing its structures. This information may then be used to create a three-dimensional representation of the object. However, due to the advancement of technology, a vast amount of data can be obtained through imaging and distance measurements, which has to be processed and analyzed correctly.

Three-dimensional and two-dimensional imaging tools, such as laser scanners and cameras, measure in an automatic way a large number of points on the surface of an object, and often output a point cloud as a data file. Such imaging tools are useful for capturing visual information of an environment or a facility, and are widely used in construction industry, civil engineering, and asset management, among other applications. For some applications, such as asset management, it is often desirable to integrate asset information with visual information. For example, an operator viewing a scanned image of a plant may want to view the asset information related to a particular asset appearing in the scanned image. The asset information may include, for example, manufacturer's name, model number, specifications, computer-added design (CAD) model, maintenance history, and the like. Conversely, an operator viewing a list of assets may want to see where a particular asset is located in the plant from the scanned image. For some other applications, it may be desirable to create CAD models of the objects captured by an imaging tool. There is currently a lack of efficient ways of linking asset information with visual information.

Thus, there is a need in the art for a method and system for identifying objects from images acquired using an imaging tool.

SUMMARY OF THE INVENTION

The present invention relates generally to surveying and facility analysis, including as applied in the building construction industry. More particularly, embodiments of the present invention relate to a method and system creating 3D solid models of mechanical structures, including pipes and ducts. In a particular embodiment, the methods and systems described herein can be utilized to catalog existing mechanical structures in a building, providing an "As Built" analysis of an existing building. The invention has wider applicability than this example and other applications are included within the scope of the present invention.

According to an embodiment of the present invention, a method includes providing a processor, obtaining an image of a scene including one or more objects, and presenting, using the processor, the image of the scene to a user. The method also includes receiving a geometry type associated with one of the one or more objects, receiving a set of inputs from the user related to the one of the one or more objects, and determining, using the processor, a centerline of the one of the one or more objects. The method further includes measuring, using the processor and inputs from the user, two or more coordinate positions along the centerline, receiving a dimension associated with the one of the one or more objects, and creating, using the processor, a 3D solid model using the geometry type, the dimension, the set of inputs, and the two or more coordinate positions.

According to another embodiment of the present invention, a graphical user interface is provided. The graphical user interface includes an image pane operable to display an image of a scene including one or more objects and a geometry region operable to display a plurality of geometry types. The graphical user interface also includes a measurement region operable to display user prompts related to measurements of coordinate positions and a dimension region operable to receive user input related to a dimension of one of the one or more objects.

According to a specific embodiment of the present invention, a method of cataloging mechanical structures in a building is provided. The method includes displaying an image of a scene in a graphical user interface. The scene includes at least one mechanical structure. The method also includes providing a list of classes of mechanical structures, receiving a user selection of one of the classes from the list of classes of mechanical structures, receiving user inputs related to terminal portions of the at least one mechanical structure, and obtaining coordinate positions associated with two or more points on the at least one mechanical structure. The method further includes receiving user input related to a dimension of the at least one mechanical structure and generating a 3D model of the at least one mechanical structure. The 3D model includes location information for the at least one mechanical structure. Furthermore, the method includes storing the 3D model of the at least one mechanical structure in a catalog.

Numerous benefits are achieved by way of the present invention over conventional techniques. For example, embodiments of the present invention provide methods and systems for creating 3D models in the field as measurements are made rather than using post-processing techniques. Additionally, embodiments of the present invention facilitate creating 3D models using a only a few measurements per object rather than extremely large point clouds. In an embodiment, 3D models can be created in a significantly shorter amount of time than using traditional 3D scanning methodologies—both in the field and in the office. Some embodiments enable the verification of geometric properties of objects to be modeled (e.g., the diameter of a pipe) while in the field and mitigate the potential to have to go back to the location for later verification. Moreover, some embodiments limit the capturing of measurements and creation of models for the objects of interest, eliminating the need to filter or clean-up extra data as it typical with 3D laser scanning methodologies. These and other embodiments of the invention along with many of its advantages and features are described in more detail in conjunction with the text below and attached figures.

DETAILED DESCRIPTION OF SPECIFIC EMBODIMENTS

Embodiments of the present invention relate to methods and systems for creating 3D solid models of mechanical structures, including pipes and ducts, using feature detection. In a particular embodiment, the methods and systems described herein can be utilized to catalog existing mechanical structures in a building, providing an "As Built" analysis of an existing building. The invention has wider applicability than this example and other applications are included within the scope of the present invention.

Figure 1:
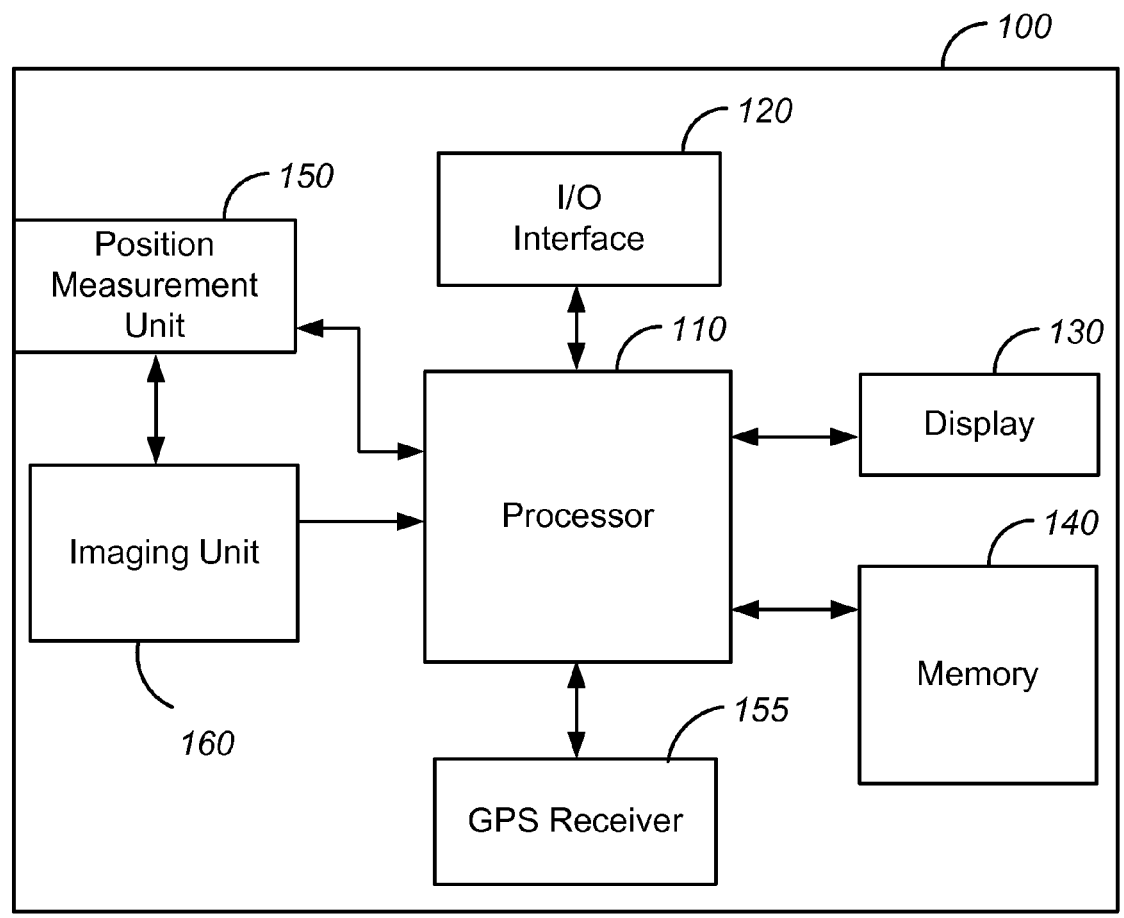
FIG. 1 is a simplified block diagram of a 3D modeling system according to an embodiment of the invention.

FIG. 1 is a simplified block diagram of a 3D modeling system according to an embodiment of the invention. The 3D modeling system 100 includes a processor 110, an input/output (I/O) interface 120, a display 130, a memory 140, a position measurement unit 150, and an imaging unit 160. As described more fully throughout the present specification, the system receives inputs from the user as well as data from the position measurement unit and the imaging unit and processes these inputs to form 3D solid models of objects such as pipes, ducts, and the like.

The imaging unit 160 can be a camera, a stereoscopic camera, a laser scanner, a photogrammetric system, a 3-D scanner, an optical total station, a consumer-grade camera, a mobile spatial camera, such as is used for mobile data capture in outdoor and indoor scenes, or the like. Data collected by the imaging unit can be provided to processor 110 for image processing, storage in memory 130, or the like. The image data or processed versions of the image data can be displayed on display 130, for example, an LCD screen or other suitable display that can be integrated with the 3D modeling system 100. In some embodiments, the display is a touch screen, incorporating elements of the I/O interface 120, although additional I/O functionality can be provided using elements separate from the touch screen display. Using the imaging tool 160, an image of a scene is captured and displayed to the user. Additional description related to the scene of an image is discussed in relation to the graphical user interfaces illustrated in FIGS. 4A-4D.

Position measurement unit 150 is configured to detect a coordinate position of locations present in the image of the scene. Several technologies can be used to measure the coordinate position of locations. As illustrated in FIG. 1, the 3D modeling system 100 can include a GPS receiver 155, which is configured for position determination by receiving signals of a global navigation satellite system. In some embodiments the 3D modeling system is integrated with a terrestrial surveying instrument, such as a Total Station, available from the present assignee, which can be used in conjunction with or as a replacement for the GPS receiver 155. The position measurement unit 150 may include an electro-optical distance measuring system, in particular a laser distance measuring instrument. The coordinate positions of elements in the image of the scene may be determinable using the data obtained by the position measuring unit 150 in conjunction with the data obtained by the GPS receiver 155. The coordinate position can be determined using positioning data obtained using a surveying instrument such as a Total Station, which uses data such as: a distance of the position measuring unit from the element of interest in the scene (also referred to as a target), a horizontal angle to the target, a vertical angle to the target, the position and/or altitude data of the survey point associated with the surveying instrument, which can be acquired by the GPS receiver, and the like. Thus, using the surveying instrument positioned at a known location, the coordinate position (e.g., the [x, y, z] location) of desired points along the centerline can be determined as will be evident to one of skill in the art. Although a GPS receiver is illustrated, this should be understood to represent an example of a receiver for a satellite navigation system and other receivers, including receivers suitable for use with GLONASS, Galileo, or the like are included within the scope of the present invention.

As an example, the position measurement unit 150 can include an electronic distance measurement (EDM) system that can utilize lasers or other electrical or optical signals to precisely measure the distance from the 3D modeling system to the target. In other embodiments, photogrammetry is used to measure the coordinate position of the targets. Thus, multiple kinds of position measurement systems are included within the scope of the present invention. One of ordinary skill in the art would recognize many variations, modifications, and alternatives.

Referring once again to FIG. 1, the position measurement unit 150, the imaging unit 160, and the GPS receiver 155 are coupled to processor 110. Processor 110 is configured to receive coordinate position data and imaging data from position measurement unit 150 and imaging unit 160, respectively. Processor 110 is further configured to associate the coordinate position data with imaging data. Processor 110 can output imaging data and position data using the I/O interface 120. The I/O interface 120 enables a user or a remote system to interact with the 3D modeling system 100, for example, providing control inputs, receiving image, coordinate position, and/or 3D solid model data from the system, controlling the operation of the imaging unit, providing data that is stored in memory 140, or the like. One of ordinary skill in the art would recognize many variations, modifications, and alternatives.

According to embodiments of the present invention, the processor 110 can be any type of processor such as a microprocessor, field programmable gate array (FPGA) and/or application specific integrated circuit (ASIC). In other embodiments, the processor 110 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 110 executes instructions and includes that portion of the 3D modeling system 100 that controls the operation of the entire system. Although not depicted in FIG. 1, the processor 110 typically includes a control unit that organizes data and program storage in memory and transfers data and other information between the various parts of the system. The processor 110 is operable to receive input data from the various system components, read and stores code and data in memory 140, and present data to and receive data from the I/O interface 120.

Imaging data, coordinate position data, user inputs (e.g., geometry and dimension data related to objects to be modeled) and composite data generated from these and other sources (e.g., 3D solid model data) can be stored in memory 140. Data received and/or processed by the processor 110 can be stored by memory 140, which represents one or more mechanisms for storing data. The memory 140 may include read-only memory (ROM), random access memory (RAM), magnetic disk storage media, optical storage media, flash memory devices, and/or other machine-readable media. In other embodiments, any appropriate type of storage device may be used. Although only one memory 140 is shown, multiple storage devices and multiple types of storage devices may be present.

The memory 140 includes a controller (not shown in FIG. 1) and data items. The controller includes instructions capable of being executed on the processor 110 to carry out the methods described more fully throughout the present specification. In another embodiment, some or all of the functions are carried out via hardware in lieu of a processor-based system. In one embodiment, the controller is a web browser, but in other embodiments the controller may be a database system, a file system, an electronic mail system, a media manager, an image manager, or may include any other functions capable of accessing data items. Of course, the memory 140 may also contain additional software and data (not shown), which is not necessary to understand the invention. Data received and processed by the processor can be displayed using I/O interface 120, which may include a user interface for receiving and displaying data, images, and the like. Additionally, it will be appreciated that imaging data and coordinate position data may be presented to a user through display 130.

When implemented in software, the elements of the invention can be essentially the code segments to perform the necessary tasks. The program or code segments can be stored in a non-transitory processor-readable medium. The processor-readable medium, also referred to as a computer-readable medium may include any medium that can store or transfer information. Examples of the processor readable medium include an electronic circuit, a semiconductor memory device, a ROM, a flash memory or other non-volatile memory, a floppy diskette, a CD-ROM, an optical disk, a hard disk, etc. The code segments may be downloaded via computer networks such as the Internet, Intranet, etc.

Figure 2:
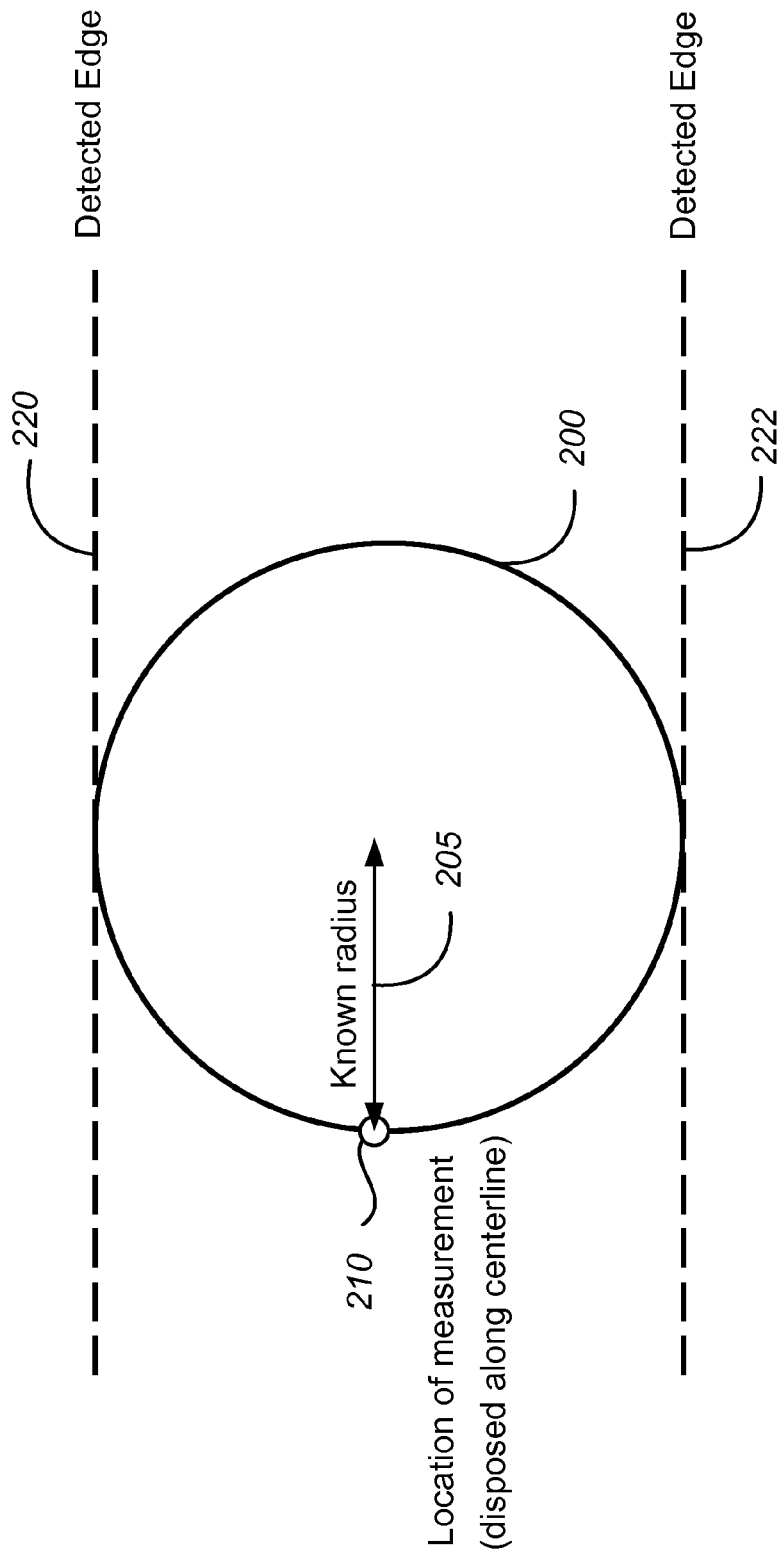
FIG. 2 is a simplified schematic diagram illustrating edge detection and centerline determination according to an embodiment of the present invention.
Figure 3A:
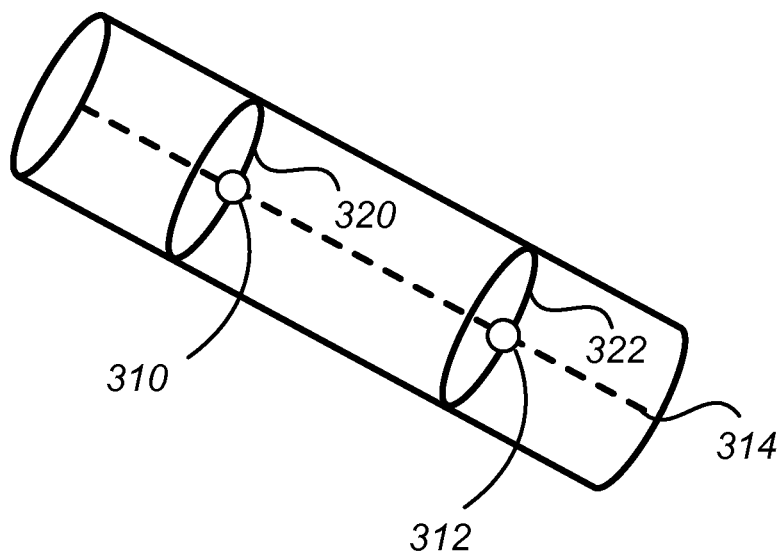
FIG. 3A is a simplified perspective diagram illustrating edge detection and centerline determination according to an embodiment of the present invention.
Figure 3B:
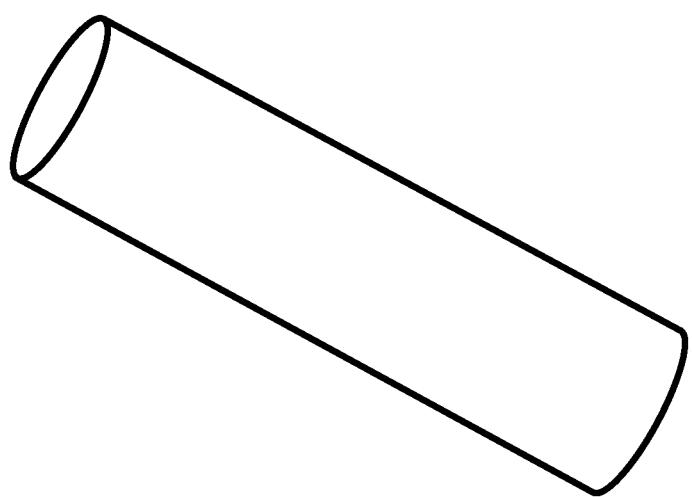
FIG. 3B is a simplified perspective diagram of a 3D model according to an embodiment of the present invention.

FIG. 2 is a simplified schematic diagram illustrating edge detection and centerline determination according to an embodiment of the present invention. The illustration in FIG. 2 represents an end view or cross section of a cylindrical pipe, which is used as an example of a mechanical structure. It should be understood that the edge detection and centerline determination process illustrated in FIG. 2 shows the end view of a mechanical structure when in fact, during implementation, the user will have a perspective view of the mechanical structure as illustrated in FIGS. 3A and 3B. Edge detection algorithms can be used to detect the edges of a mechanical structure, such as the illustrated pipe. Using the edges as detected in an image, the position of a centerline can be determined. Typically, mechanical structures such as pipes and ducts are fabricated using standard sizes. As a result, an experienced user will typically be able to visually inspect a mechanical structure and determine the size of the mechanical structure, which can be input into the system. As described below, the coordinate positions of two or more points disposed on the centerline on the exterior surface of the mechanical structure are measured. One of the measurement locations is illustrated in FIG. 2 as location 210. Given the known radius or diameter of the pipe, circle 200 can be constructed to pass through location 210. Because the radius is known, the detected edges 220 and 222 will be tangential to the circle 200 as illustrated. As described below, a cylinder can be projected based on the circles associated with two measurement locations, resulting in the creation of a 3D solid model.

FIG. 3A is a simplified perspective diagram illustrating coordinate position determination according to an embodiment of the present invention. The coordinate locations of points 310 and 312 along the centerline 314 are determined using a surveying instrument or other suitable system as described above. As described in relation to FIG. 2, using the two measured points along the centerline and the known or computed diameter of the object (e.g., pipe 405), two circles 320 and 322 lying in planes orthogonal to the centerline can be formed passing through the measured points (with the centerline tangential to the circles) and having a diameter equal to the diameter of the object. As discussed in relation to FIG. 2, the detected edges will also be tangential to the circles. Using the defined length of the object, the two circles can be swept along the pipe (a cylinder can be projected through the two circles and the cylinder can be extended to the length defined by the user or the system), thereby defining a 3D solid model for the object as illustrated in FIG. 3B. Thus, embodiments are able to create a 3D solid model of a mechanical structure using only two physical measurements and the dimensions of the mechanical structure.

Although embodiments illustrated with respect to FIGS. 3A and 3B are described in relation to cylindrical pipes, embodiments of the present invention are not limited to this particular geometry. Other geometries, including rectangular ducts, non-rectangular (e.g., trapezoidal) ducts, corner elements such as elbows, planes including walls and ceilings, oval duct, structural steel, and the like are included within the scope of the present invention.

As an example, for a rectangular duct with dimensions of 16" width and 12" height, a centerline can be formed along the bottom surface of the ductwork and 2D rectangles can be created at two positions along the bottom surface, with the rectangular 3D solid being formed by extending a parallelepiped between the two 2D rectangles to the ends of the duct, previously marked by the user. Ductwork is not limited to rectangular ducts, but can also include other shapes. As an example, if a duct has a cross-section in the shape of a trapezoid, the dimensions of the duct could be entered and trapezoids could be constructed at two locations along one of the surfaces of the duct, for example, the bottom surface. These trapezoids can then be extended to the terminal portions of the ductwork. As will be evident to one of skill in the art, the graphical user interfaces can be modified to receive sets of dimensions as appropriate for these shapes characterized by more than a single dimension. One of ordinary skill in the art would recognize many variations, modifications, and alternatives.

In addition to ducts, pipes, and the like, other structural elements in a building can be analyzed, with 3D solid models being constructed as described herein. For example, steel structural elements including I-beams, H-beams, and the like, which typically have defined, standard sizes similar to the standard sizes associated with pipe, ducts, and the like, can be measured and analyzed in order to create 3D solid models. For an I-beam, techniques related to those used to measure pipes and ducts can be used to input the known dimensions of the beam (e.g., a 12"×6" I-beam with a ½" flange), define the terminal portions of the beam, edge detection can be used to define the edges (e.g., bottom edges), a centerline along a surface can be computed, two positions along the centerline can be input to drive a measurement of the coordinate positions of the two positions, and the 3D solid model can be created using these inputs and measurements. In some implementations, the workflow can not only receive inputs from the user, but provide instructions to the user, for example, to indicate two positions on the base of the I-beam that will be used to construct the 3D solid model. In addition to receiving inputs on the dimensions of the structural elements, the measurement equipment can be utilized to obtain data related to the structural elements such as the coordinate positions along the bottom of the structural elements and coordinate position information on an interior feature of the structural element, that are then used in constructing the 3D solid model. For instance, if the flange width of an I-beam is not known, the measurement equipment can be used to measure the flange width, which can then be used by the system.

For a planar structure such as a wall, the ends of the wall can be used as the set of inputs (marking the ends or terminal portions of the wall, edge detection can determine the top and bottom of the wall, coordinate locations of three positions on the wall as indicated by the user through the measurement device can be measured, and the surface of the wall can be constructed. In some embodiments, additional edge detection is utilized to remove doors and windows from walls, improving the mapping of the building.

In some embodiments, the ends of the pipe, duct, or the like are detected by the system as part of the edge detection process since edges are generally straight. As will be evident to one of skill in the art, joints between sections of a duct and other non-linear features can be removed during edge detection.

Although some embodiments of the present invention are discussed in terms of cylindrical pipes, the present invention is not limited to these particular shapes. As described herein, 3D modeling using feature detection is applicable to a wide variety of geometric and mechanical structures, including rectangular ducts, oval ducts, planar walls, planar floors, or the like. As examples, a finite length box and a rectangular duct are illustrated below.

Figure 3C:
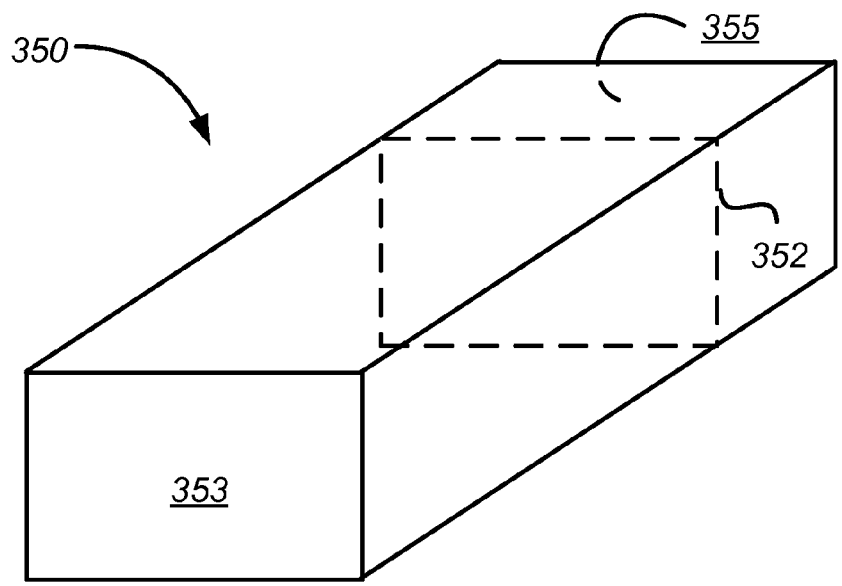
FIG. 3C is a simplified perspective diagram of a 3D model for a finite length box according to an embodiment of the present invention.
Figure 3D:
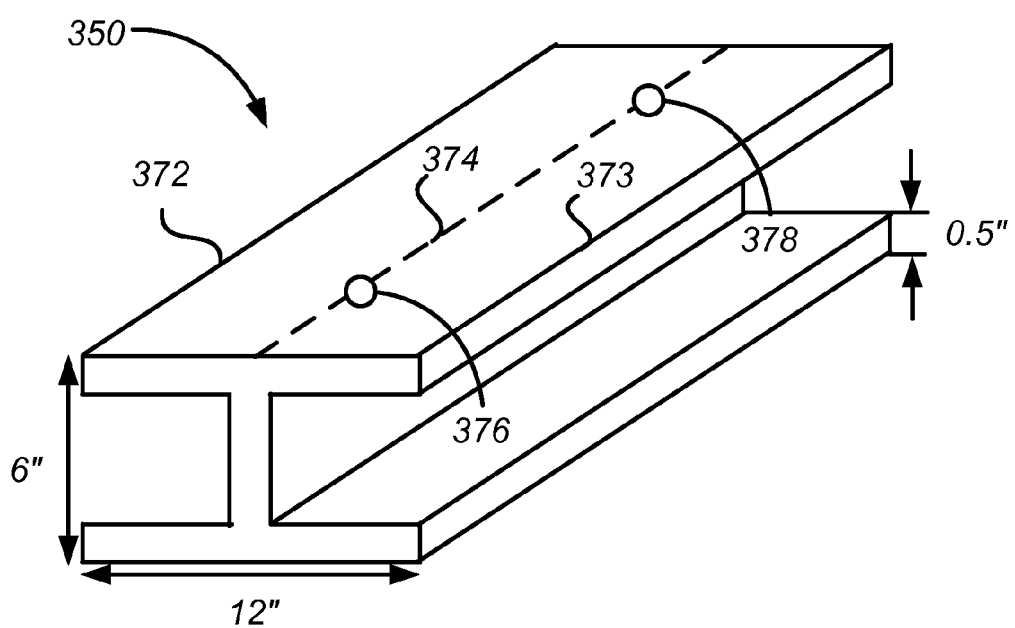
FIG. 3D is a simplified perspective diagram of a 3D model for an I-beam according to an embodiment of the present invention.

FIG. 3C is a simplified perspective diagram of a 3D model for a finite length box according to an embodiment of the present invention. FIG. 3D is a simplified perspective diagram of a 3D model for an I-beam according to an embodiment of the present invention.

Referring to FIG. 3C, a finite length box 350 is illustrated. The box 350 is generated as a 3D model in one embodiment by detecting the edges of the box and constructing a rectangle 352 that can be swept along in space from a first end 353 of the box to a second end 355 of the box. In some embodiments, the dimensions of the box are known, for example, standard dimensions, enabling construction of rectangle 352.

Referring to FIG. 3D, I-beam 370 is illustrated. The dimensions of the I-beam can be measured or known (e.g., a 12"×6" I-beam with a ½" flange). The ends of the I-beam can be defined, and edge detection can be used to define the edges (e.g., top edges 372 and 373), and a centerline 374 along the top surface can be computed. Using two positions 376 and 378 along the centerline, a measurement of the coordinate positions of these two positions can be made and the 3D solid model can be created using these inputs and measurements.

Figure 4A:
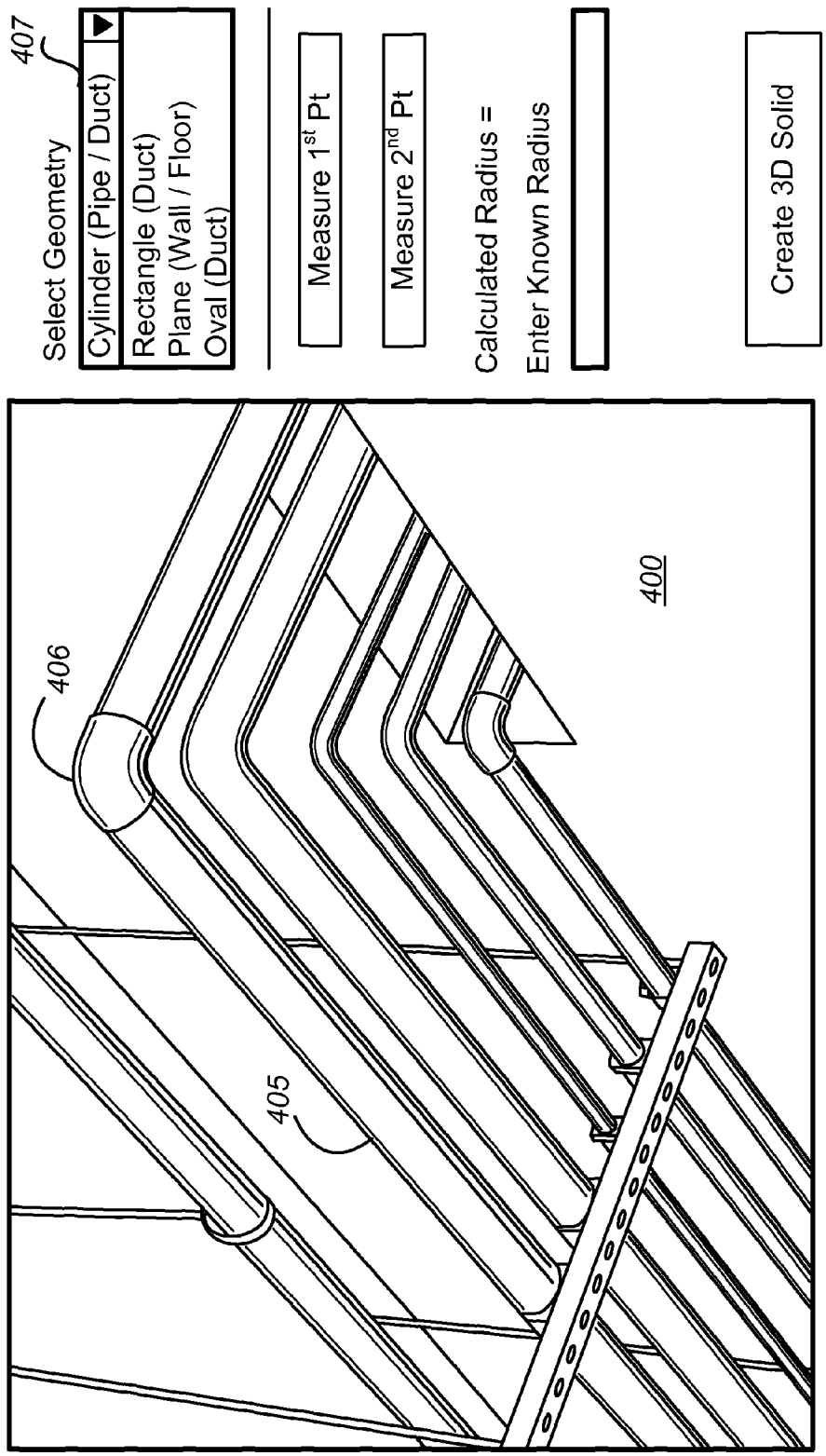
FIGS. 4A-4D are simplified graphical user interfaces for a system for performing 3D modeling using feature detection according to an embodiment of the present invention.

FIGS. 4A-4D are simplified graphical user interfaces for a system for performing 3D modeling using feature detection according to an embodiment of the present invention. As illustrated in FIG. 4A, a plurality of pipes, typical of building construction, are supported at a distance from the ceiling of the building. Cylindrical pipe 405 is used as an example below. According to embodiments of the present invention, solid models for the various pipes are created using the graphical user interfaces illustrated in FIGS. 4A-4D. Other mechanical structures, including, without limitation, ductwork, mounting brackets, support elements, walls, windows, and the like. Thus, embodiments of the present invention are suitable for use in documenting the mechanical structures and building elements of an existing building, which can be referred to as an "As Built" inventory.

The method includes obtaining an image of a scene 400 and displaying the image on the graphical user interface. The graphical user interface also provides a region suitable for displaying a dropdown menu listing classes of mechanical structures as well as other data input regions as described more fully below. Using the list of classes of mechanical structures 407, which is illustrated as a dropdown list, the user can select the class from the list of classes in order to define the geometry associated with the object (i.e., the mechanical structure) of interest. In this example, the user would select a geometry of a cylinder, which can be associated, for example, with pipe 405, a duct, a conduit, or the like.

Figure 4B:
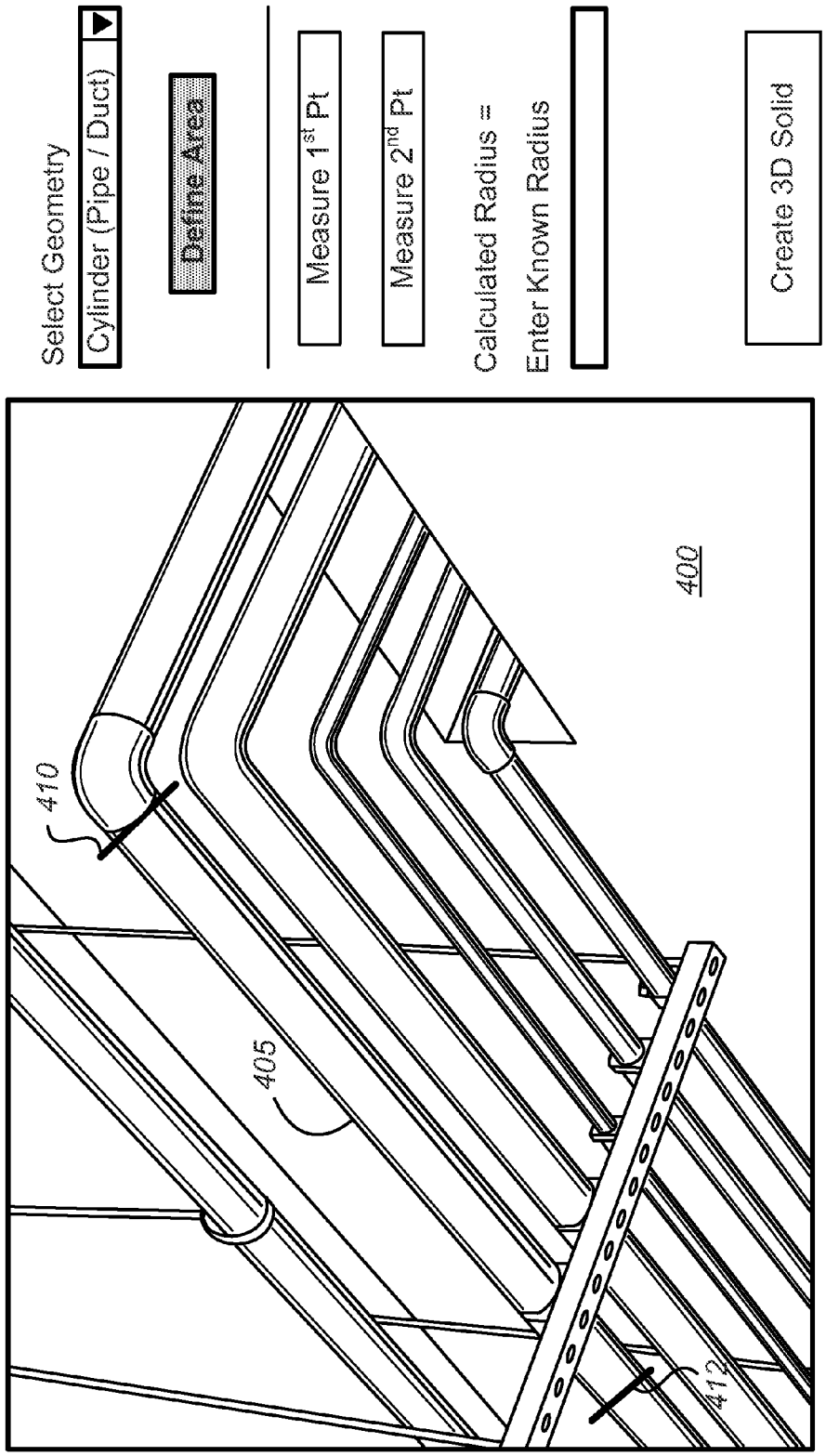

Referring to FIG. 4B, the graphical user interface enables the user to define the portions of the object to be modeled by defining the terminal portions of the object. In order to define the extent over which the 3D solid model will be created, the user draws two lines 410 and 412 on the image of the object that intersect the object. The graphical user interface can provide instructions (both graphical and verbal) to the user related to drawing the two lines illustrated in FIG. 4B. As shown in FIG. 4B, line 410 defines an end of the cylindrical pipe 405 adjacent an elbow and line 410 defines another "end" of the pipe near the edge of the image. As shown in the image, the pipe extends to an additional distance to the left of the image, but in order to create a 3D solid model of the illustrated portion of pipe 405, line 412 is used to define the current extent at the left hand side of the image. Using embodiments of the present invention, it is possible to image portions of the mechanical structures to the left of the current image and thereby extend the length of the 3D solid model. One of ordinary skill in the art would recognize many variations, modifications, and alternatives.

As illustrated in FIG. 4B, the "Define Area" graphic is highlighted in the graphical user interface, providing instructions to the user in relation to defining the terminal portions of the pipe to be modeled.

Figure 4C:
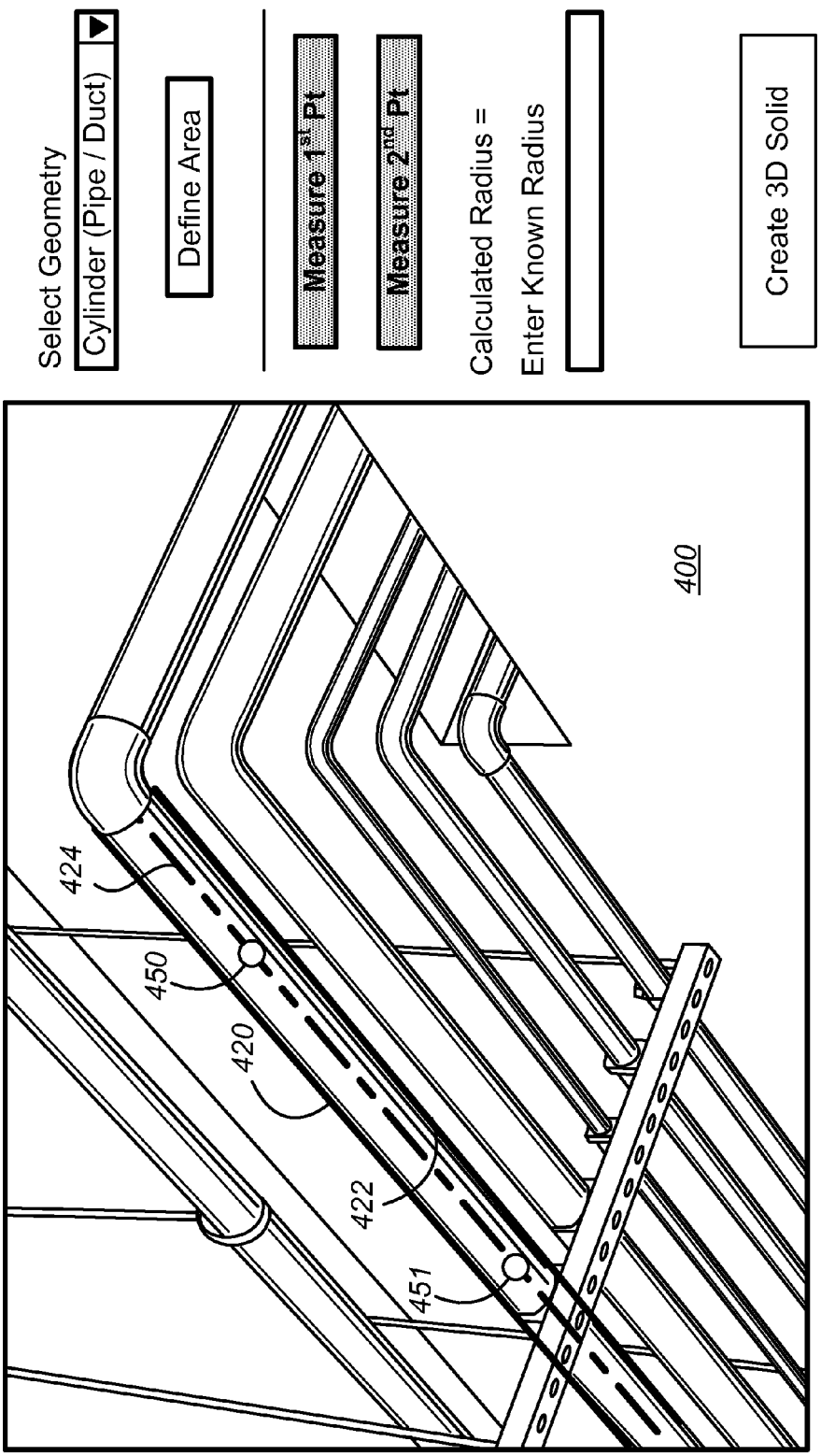

FIG. 4C illustrates an updated stage of the graphical user interface in which the image of the pipe of interest has been augmented to include edge lines 420 and 422 as well as centerline 424. In some embodiments, different colors are utilized to illustrate the edge lines 420/422 and the centerline 424 depending on the color of the pipes in the image. Using appropriate software, the edge lines are determined and the centerline is created based on the edge lines. Depending on the orientation of the user to the object or mechanical structure of interest, the centerline may be on the bottom portion of the object or at positions on the object other than the bottom, since as illustrated in FIG. 4C, the user is positioned at an angle with respect to the bottom-top axis of the pipes. Using the centerline, the user is able to use the system to measure a first point along the centerline and a second point along the centerline, as indicated by the "Measure $1^{st}$ Pt" and "Measure $2^{nd}$ Pt" boxes being highlighted in the graphical user interface. In some implementations, a "snap to grid" feature is utilized to assist the user in measuring points lying along the centerline. If the user indicates a position adjacent to the centerline, the system will snap this position to the centerline so that the measurement will be made at the point on the centerline close to the indicated position. As an example, the user can mark points 450 and 451 for the two points that are to be measured, i.e., the "1$^{st}$ Pt" and the "2$^{nd}$ Pt" as illustrated in FIG. 4C. Using the position measuring unit 150 discussed in relation to FIG. 1, the two points 450 and 451 lying along the centerline are measured to determine the coordinate position (e.g., GPS location) of the points. More than two points can be measured in some embodiments.

The graphical user interface illustrated in FIG. 4C also provides an input region that the user can utilize to enter the radius or other dimension of the object, e.g., the radius of pipe 405. The diameter of the pipe may also be entered as will be evident to one of skill in the art. For users that are experienced with mechanical structures utilized in factories, plants, and other facilities, visual inspection of the mechanical structure will typically enable the user to enter the dimension. In order to assist the user, the dimension (e.g. the radius) can be computed using data collected by the position measuring unit. In some embodiments, the calculated dimension is thus prefilled and just confirmed by the user. As examples, the approximate radius of a pipe can be computed or calculated and provided to the user in advance of the user providing the known radius. For ductwork or structural elements including structural steel or iron, the approximate height and/or width can be computed and displayed before receiving known dimensions from the user. In other embodiments, the calculated dimension is utilized in creating the 3D solid model without input from the user. One of ordinary skill in the art would recognize many variations, modifications, and alternatives.

Figure 4D:
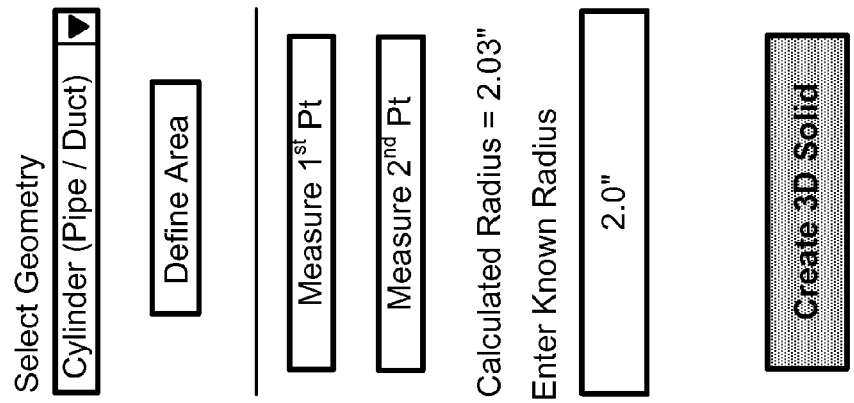
Figure 4D:
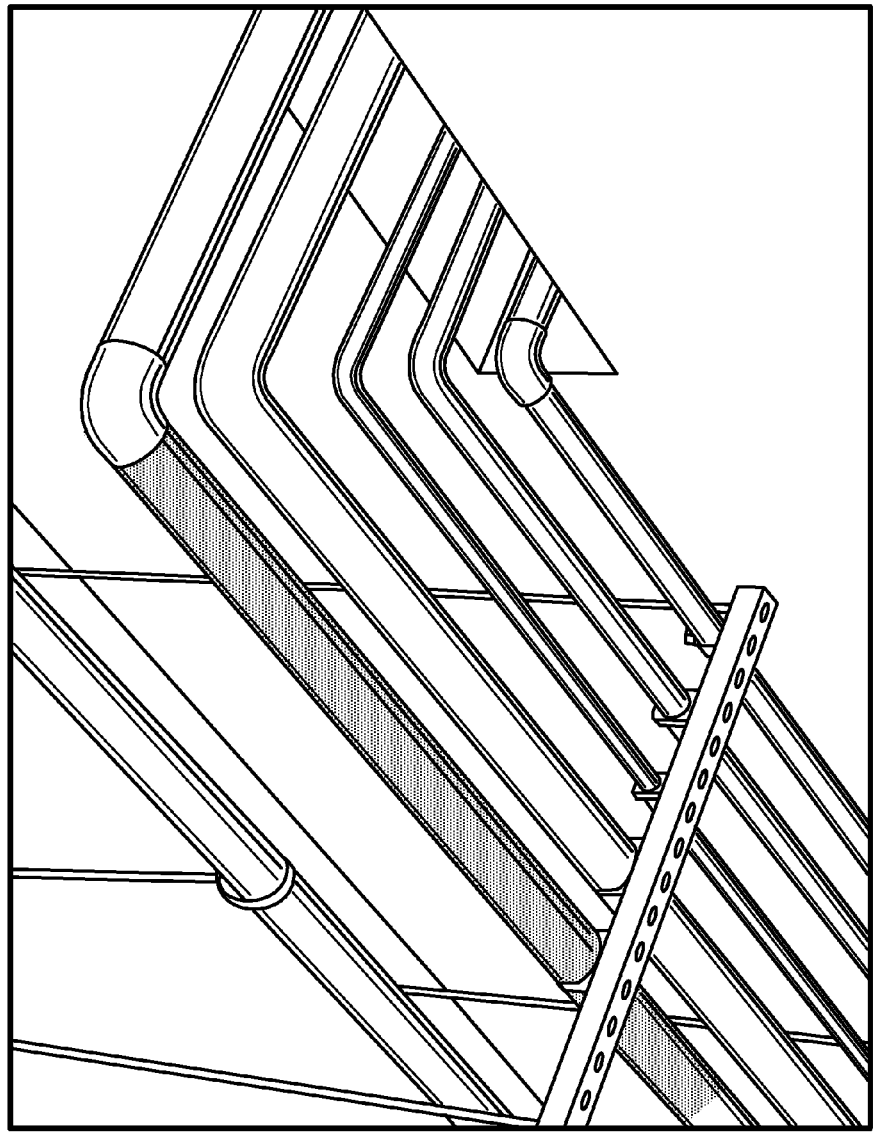

FIG. 4D illustrates the creation of the 3D solid model using the data described herein as shown by the highlighting of the "Create 3D Solid" box. Data from the image, the measured positions, and the calculated/entered dimensions can be used along with other data as appropriate. Although not illustrated, data entry regions for receiving metadata about the mechanical structure can also be provided in this graphical user interface. The 3D solid model is illustrated by the shading of pipe 405. The creation of the 3D solid model can be initiated in response to the user providing input in the region of the display including the box "Create 3D Solid" or may be initiated once the user input related to the dimension of the object of interest is provided. One of ordinary skill in the art would recognize many variations, modifications, and alternatives.

In some embodiments, the system operator, who may be a person experienced in installing building facilities, including water pipes, heating and air conditioning ducts, other mechanical structures, and the like, can provide additional information related to the measured facilities. This additional information can be stored as metadata in conjunction with the 3D solid models created by the system. As an example, the user can identify the material type (e.g., PVC pipe), functionality (e.g., supply water or return water), and other attributes of the facilities, which can then be utilized as appropriate. Thus, using a combination of measured data and user input, both obtained during the measurement and analysis process, embodiments of the present invention provide benefits not available using conventional systems. In some embodiments, data related to the mechanical structure and the associated 3D solid model is stored in a database, which may be referred to as a catalog. The data can include the metadata discussed above as well as the location of the mechanical structures, which can be GPS location data that a user could subsequently use to locate the desired mechanical structure in the building. Thus, the catalog can include a list of mechanical structures in a building, a room of a building, or the like, with various data on the mechanical structure including location, use, material properties, age, replacement date, or the like.

As discussed in relation to FIGS. 4A-4D, a workflow is provided that facilitates the creation of 3D solid models for the various objects of interest in the scene, for example, an interior portion of a building. The workflow receives the geometry information on the object, which can also be referred to as category information, for example, cylindrical, rectangular, or the like. By defining the terminal portion, the user provides inputs for the system to perform edge detection and centerline formation. Measuring the two or more coordinate positions and using the dimensions of the object (e.g., radius), the system is able to construct the 2D shapes (e.g., circles) that can be extended to the terminal portions to form the 3D solid model. Although a variety of objects may be present in the scene, the system provides flexibility for the user to create 3D solid models for all or a subset of the objects. Thus, a user only interested in ductwork can only categorize those objects.

Although some embodiments are described in terms of straight sections of pipes or ducts, corner elements can also be analyzed by embodiments of the present invention although this is not required by the present invention. As an example, elbow element 406 illustrated in FIG. 4A can be a standard dimension elbow (e.g., a 4" 90° elbow) used to join the two pipes illustrated. By identifying the joints between the two pipes and the elbow, a measurement of the coordinate positions of the ends of the elbow can be made. Circles passing through the ends of the elbow and the dimensions of the elbow can then be used to construct the 3D shape of the elbow. In some implementations, the ends of the pipes, determined by the edge detection computation, can be used in the 3D solid model construction for these joint elements. Thus, embodiments described herein apply to a variety of standard or catalogued items, including, without limitation, a variety of geometric shapes that are ascertainable by measuring two or more coordinate positions along an exterior surface of the shape and using dimension or size information provided by the user. It should be noted that in some implementations, data obtained in relation to the creation of the 3D solid model for objects on either side of a corner element can be utilized to create the 3D solid model for the corner element. As an example, for the elbow 406 illustrated in FIG. 4A, after the pipes to which the elbow are joined are measured and modeled, instructions can be given to connect the pipes with a 90° connector. Since the terminal portions of the pipes are now known (i.e., the coordinate positions in space associated with the ends of the cylinders), a 90° elbow can be inserted between the pipes without measurements since the known dimensions of the elbow will fit between these coordinate positions.

Figure 5:
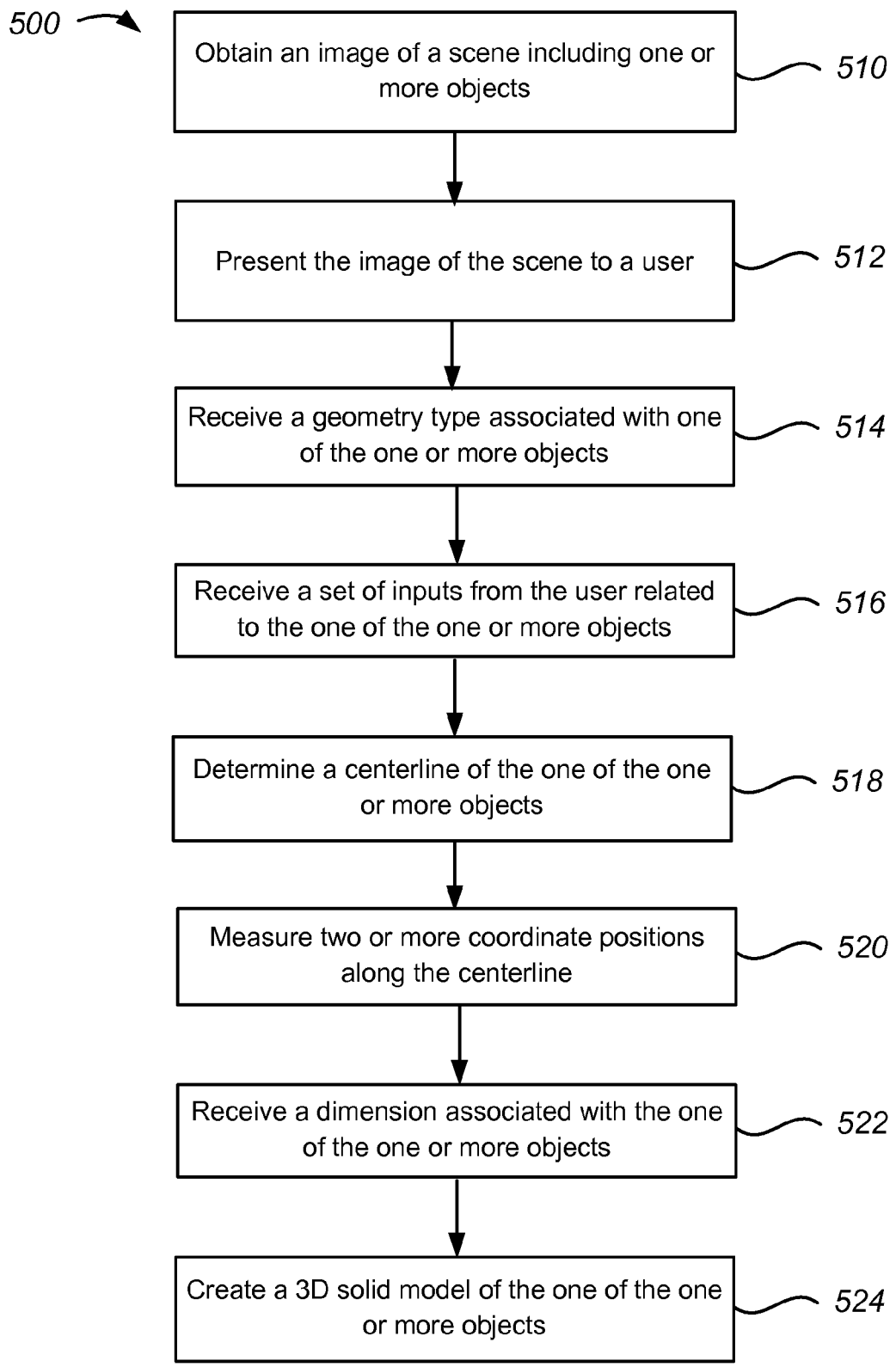
FIG. 5 is a simplified flowchart illustrating a method of performing 3D modeling using feature information according to an embodiment of the present invention.

FIG. 5 is a simplified flowchart illustrating a method of performing 3D modeling using feature information according to an embodiment of the present invention. The method 500 includes providing a processor and obtaining an image of a scene including one or more objects (510) and presenting, using the processor, the image of the scene to a user (512). The one or more objects include at least one of a pipe or a duct in some embodiments, for example, pipes or ducts that conform to a standard size.

The method also includes receiving a geometry type associated with one of the one or more objects (514), receiving a set of inputs from the user related to the one of the one or more objects (516) and determining, using the processor, a centerline of the one of the one or more objects (518). The set of inputs may correspond to terminal portions of the one of the one or more objects, defining the ends of the 3D model that is to be created. In a particular embodiment, the inputs may be used to define locations along ductwork, define the ends of cable conduit, or the like. In a specific embodiment, the set of inputs from the user are received by identification of two locations on the image of the scene. Determining the centerline of the one of the one or more objects is performed by a processor and includes detecting opposing edges of the one of the one or more objects. Additional description related to edge and centerline detection is provided in commonly assigned U.S. Patent Application Publication No. 2010/0165101, published on Jul. 1, 2010, the disclosure of which is hereby incorporated by reference in its entirety for all purposes.

Furthermore, the method includes measuring, using the processor and inputs from the user, two or more coordinate positions along the centerline (520) and receiving a dimension associated with the one of the one or more objects (522). In an embodiment, the geometry type includes various geometries such as a cylinder, a rectangle, a plane, or the like. For cylindrical pipes, the dimension can be received as a radius or diameter of the cylindrical pipe. For rectangular ducts, the dimension can be received as a height or width of the rectangular duct. In some embodiments in which ductwork is measured, three points can be measured on the face of a section of the ductwork, thereby defining one of the planar surfaces of the ductwork.

The method also includes creating, using the processor, a 3D solid model using the geometry type, the dimension, the set of inputs, and the two or more coordinate positions (524). Creating the 3D solid model can include forming a set of 2D geometric shapes using the centerline and the two coordinate positions and forming the 3D solid model using the set of 2D geometric shapes. As an example, forming the 3D solid model can include extending a 3D geometric shape defined by the set of 2D geometric shapes to positions associated with the set of inputs. In an embodiment, the method also includes displaying to the user a calculated dimension prior to receiving the dimension associated with the one of the one or more objects.

It should be appreciated that the specific steps illustrated in FIG. 5 provide a particular method of performing 3D modeling using feature information according to an embodiment of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 6:
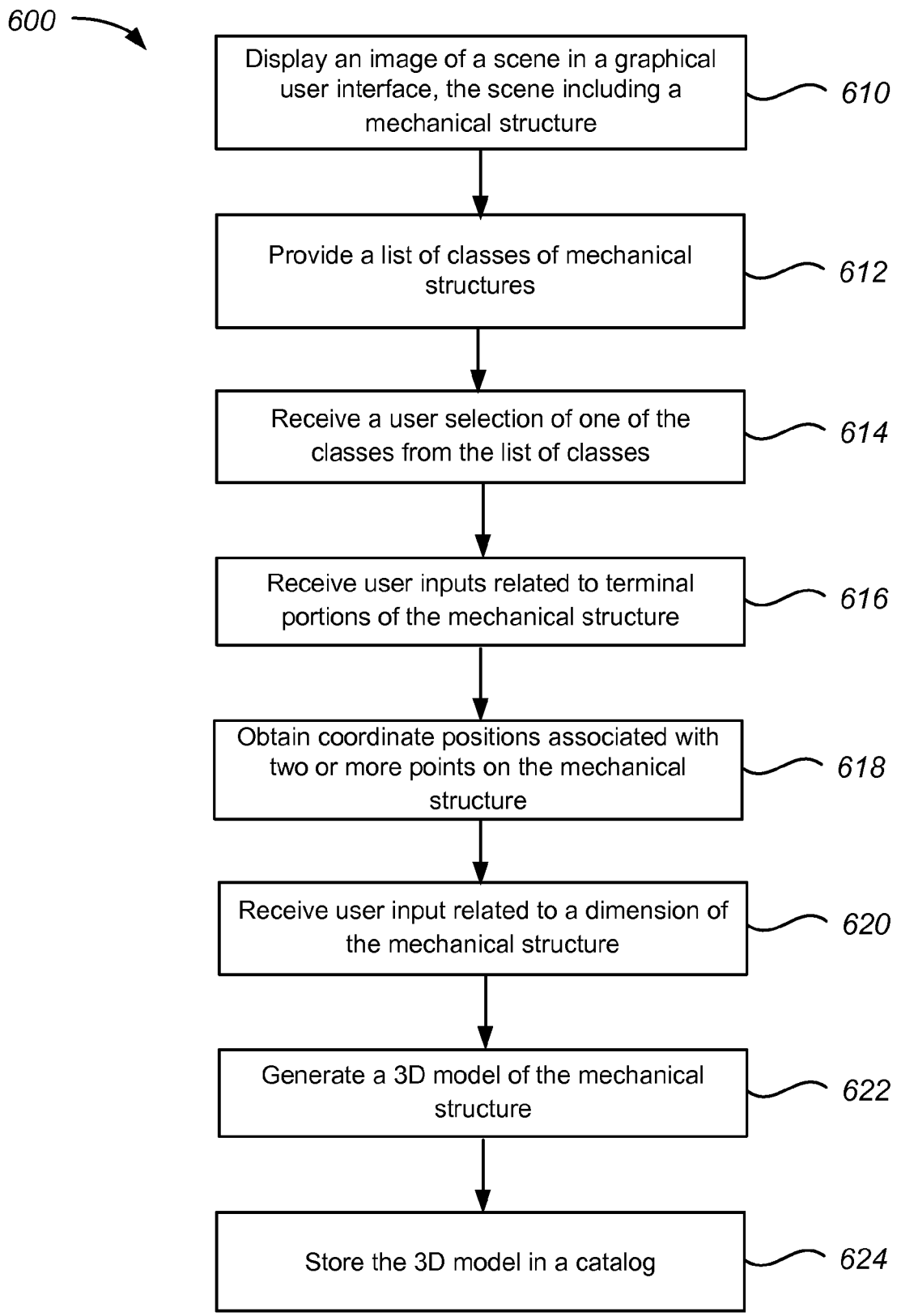
FIG. 6 is a simplified flowchart illustrating a workflow for creating a 3D solid model according to an embodiment of the present invention.

FIG. 6 is a simplified flowchart illustrating a workflow for cataloging mechanical structures in a building according to an embodiment of the present invention. The cataloging includes creating a 3D solid model as described herein. The method 600 displaying an image of a scene in a graphical user interface (610) and providing a list of classes of mechanical structures (612). The scene includes at least one mechanical structure. The classes of mechanical structures can include various geometries including rectangular ducts, cylindrical pipes, oval ducts, planar walls, or planar floors. The method also includes receiving a user selection of one of the classes from the list of classes of mechanical structures (614) and receiving user inputs related to terminal portions of the at least one mechanical structure (616).

The method further includes obtaining coordinate positions associated with two or more points on the at least one mechanical structure (618) and receiving user input related to a dimension of the at least one mechanical structure (620). In order to assist the user in inputting dimension information the method can include computing an estimated dimension using the user inputs related to terminal portions of the at least one mechanical structure and one or more of the coordinate positions and displaying the estimated dimension to the user prior to receiving the user input related to the dimension of the at least one mechanical structure. The coordinate positions associated with two or more points on the at least one mechanical structure can be positioned along a centerline of the at least one mechanical structure. Moreover, obtaining coordinate positions associated with two or more points on the at least one mechanical structure can include receiving inputs from the user identifying two locations on the at least one mechanical structure as displayed in the image of the scene.

Furthermore, the method includes generating a 3D model of the at least one mechanical structure (622). The 3D model includes location information for the at least one mechanical structure. Thus, the location information can be tied to the mechanical structure, for example, providing a GPS-based coordinate position associated with the mechanical structure. Additionally, the method includes storing the 3D model of the at least one mechanical structure in a catalog (624). In some embodiments, this storage step is not required by the present invention.

In an embodiment, the method additionally includes supplementing the list of classes of mechanical structures through user input of an additional class of mechanical structures. Thus, selection is made from a variety of different geometries. In an embodiment, an option is provided for the user to define a new geometry and associated parameters that can be added to the list of geometries.

It should be appreciated that the specific steps illustrated in FIG. 6 provide a particular workflow for creating a 3D solid model according to an embodiment of the present invention. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Trademarks and copyrights referred to herein are the property of their respective owners. The scope of the invention should, therefore, be determined with reference to the appended claims along with their full scope of equivalents.

What is claimed is:

1. A method comprising:
   providing a processor;
   obtaining an image of a scene including one or more objects;
   presenting, using the processor, the image of the scene to a user;
   receiving a geometry type associated with one of the one or more objects;

receiving a set of inputs from the user related to the one of the one or more objects, the set of inputs defining one or more structural aspects of the one or more objects;

detecting, using the processor, edges of the one of the one or more objects;

determining, using the processor, a centerline of the one of the one or more objects based upon the detected edges of the one of the one or more objects;

measuring, using the processor and inputs from the user, coordinate positions of two or more points disposed along the centerline determined by the processor;

receiving, by the processor, a dimension associated with the one of the one or more objects; and creating, using the processor, a 3D solid model using the geometry type, the dimension, the set of inputs, and the two or more coordinate positions.

2. The method of claim 1 wherein the one or more objects comprise at least one of a pipe or a duct.

3. The method of claim 2 wherein the pipe or the duct conform to a standard size.

4. The method of claim 1 wherein the geometry type comprises at least one of cylinder, rectangle, or plane.

5. The method of claim 1 wherein the dimension comprises a radius or diameter of a cylindrical pipe.

6. The method of claim 1 wherein the dimension comprises a height or width of a rectangular duct.

7. The method of claim 1 wherein the set of inputs correspond to terminal portions of the one of the one or more objects.

8. The method of claim 1 wherein determining, using the processor, the centerline of the one of the one or more objects comprises detecting opposing edges of the one of the one or more objects.

9. The method of claim 1 wherein creating the 3D solid model comprises:
    forming a set of 2D geometric shapes using the centerline and the two coordinate positions; and
    forming the 3D solid model using the set of 2D geometric shapes.

10. The method of claim 9 wherein forming the 3D solid model comprises extending a 3D geometric shape defined by the set of 2D geometric shapes to positions associated with the set of inputs.

11. The method of claim 1 further comprising displaying to the user a calculated dimension prior to receiving the dimension associated with the one of the one or more objects.

12. The method of claim 1 wherein the set of inputs from the user are received by identification of two locations on the image of the scene.

13. A method of cataloging mechanical structures in a building by a processor, the method comprising:
    displaying an image of a scene in a graphical user interface, wherein the scene includes at least one mechanical structure;
    providing, using the processor, a list of classes of mechanical structures;
    receiving a user selection of one of the classes from the list of classes of mechanical structures;
    receiving user inputs related to one or more structural aspects of the at least one mechanical structure;
    detecting, using the processor, edges of the at least one mechanical structure;
    determining, using the processor, a centerline of the at least one mechanical structure based upon the detected edges of the at least one mechanical structure;
    obtaining coordinate positions associated with two or more points disposed on the centerline of the at least-one mechanical structure determined by the processor;
    receiving, by the processor, user input related to a dimension of the at least one mechanical structure;
    generating a 3D model of the at least one mechanical structure, wherein the 3D model includes location information for the at least one mechanical structure; and
    storing the 3D model of the at least one mechanical structure in a catalog.

14. The method of claim 13 wherein the classes of mechanical structures comprise two or more of rectangular ducts, cylindrical pipes, oval ducts, planar walls, or planar floors.

15. The method of claim 13 wherein the location information comprises a GPS-based coordinate position.

16. The method of claim 13 further comprising supplementing the list of classes of mechanical structures through user input of an additional class of mechanical structures.

17. The method of claim 13 further comprising:
    computing an estimated dimension using the user inputs related to terminal portions of the at least one mechanical structure and one or more of the coordinate positions; and
    displaying the estimated dimension to the user prior to receiving the user input related to the dimension of the at least one mechanical structure.

18. The method of claim 13 wherein the coordinate positions associated with two or more points on the at least one mechanical structure are positioned along a centerline of the at least one mechanical structure.

19. The method of claim 13 wherein obtaining coordinate positions associated with two or more points on the at least one mechanical structure comprises receiving inputs from the user identifying two locations on the at least one mechanical structure as displayed in the image of the scene.

* * * * *